United States Patent
Hauser et al.

(10) Patent No.: US 9,828,025 B1
(45) Date of Patent: Nov. 28, 2017

(54) ELECTRIC TRANSAXLE WITH INTEGRAL POWER GENERATING DEVICE

(71) Applicant: Hydro-Gear Limited Partnership, Sullivan, IL (US)

(72) Inventors: Raymond Hauser, Sullivan, IL (US); Scott W. Keller, Charleston, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 45 days.

(21) Appl. No.: 14/838,626

(22) Filed: Aug. 28, 2015

Related U.S. Application Data (60) Provisional application No. 62/043,274, filed on Aug. 28, 2014, provisional application No. 62/048,518, filed on Sep. 10, 2014.

(51) Int. Cl.
| | |
|---|---|
| *B62D 11/10* | (2006.01) |
| *B62D 11/04* | (2006.01) |
| *A01D 69/02* | (2006.01) |
| *A01D 69/06* | (2006.01) |

(52) U.S. Cl.
CPC .............. *B62D 11/10* (2013.01); *A01D 69/02* (2013.01); *A01D 69/06* (2013.01); *B62D 11/04* (2013.01)

(58) Field of Classification Search
CPC .......... B62D 11/04; B62D 11/10; B60K 1/00; A01D 69/02; A01D 69/06; A01D 69/025
USPC ............ 56/10.1, 14.7, 16.7, 16.9; 180/65.32, 180/65.31, 65.6
See application file for complete search history.

(56) References Cited

U.S. PATENT DOCUMENTS

| | | | |
|---|---|---|---|
| 3,514,681 A | 5/1970 | Dorn et al. | |
| 3,652,883 A | 3/1972 | Cone | |
| 3,778,651 A | 12/1973 | Cone | |
| 4,862,009 A | 8/1989 | King | |
| 4,894,570 A | 1/1990 | Kaneyuki | |
| 5,126,582 A | 6/1992 | Sugiyama | |
| 5,818,134 A | 10/1998 | Yang et al. | |
| 6,184,603 B1 | 2/2001 | Hamai et al. | |
| 6,294,854 B1 | 9/2001 | Grosspietsch et al. | |
| 6,388,348 B2 | 5/2002 | van Heyden et al. | |
| 6,644,004 B2 * | 11/2003 | Reimers ................. | A01D 69/02 181/204 |
| 6,717,281 B1 | 4/2004 | Brandon et al. | |
| 6,856,035 B2 | 2/2005 | Brandon et al. | |
| 7,135,785 B2 | 11/2006 | Kropp et al. | |
| 7,902,708 B2 | 3/2011 | Elmaleh | |
| 8,097,997 B2 | 1/2012 | Mizuno et al. | |

(Continued)

FOREIGN PATENT DOCUMENTS

WO        WO2010028422        3/2010

*Primary Examiner* — John G Weiss
(74) *Attorney, Agent, or Firm* — Neal, Gerber & Eisenberg LLP (57) ABSTRACT

The invention comprises a transaxle having an electric motor that is controlled by a vehicle user and that drives at least one output axle. The transaxle includes a power generating device that powers the electric motor and a reduction gear train engaged to and driven by the electric motor. The transaxle includes a common housing in which the power generator, the electric motor, and the reduction gear system are each disposed. In dual-axle systems, the transaxle also includes a differential engaged to and driven by the reduction gear system to power a pair of oppositely extending output axles. The differential is also disposed within the common housing.

21 Claims, 9 Drawing Sheets

(56) References Cited

U.S. PATENT DOCUMENTS

| | | | | |
|---|---|---|---|---|
| 8,381,853 B2* | 2/2013 | Iwaki | ................... | B60L 3/0076 |
| | | | | 180/165 |
| 8,424,625 B2* | 4/2013 | Ishii | ........................ | B60K 6/26 |
| | | | | 180/65.31 |
| 8,490,722 B2* | 7/2013 | Koga | ................... | B62D 11/003 |
| | | | | 180/6.28 |
| 8,494,698 B2* | 7/2013 | Murata | ................. | B60K 6/445 |
| | | | | 180/65.21 |
| 8,662,600 B2* | 3/2014 | Koga | ........................ | B60L 7/26 |
| | | | | 303/3 |
| 8,844,658 B2* | 9/2014 | Wyatt | ..................... | B62D 3/02 |
| | | | | 180/443 |
| 9,505,304 B1* | 11/2016 | McCoy | ................... | B60K 6/52 |
| 9,579,966 B2* | 2/2017 | Luehrs | ................... | B60K 6/365 |
| 2008/0039261 A1* | 2/2008 | Cho | ....................... | B60K 6/365 |
| | | | | 475/5 |
| 2009/0195093 A1* | 8/2009 | Bandai | ................... | B60K 6/365 |
| | | | | 310/54 |
| 2012/0159916 A1* | 6/2012 | Ishii | ....................... | A01D 34/64 |
| | | | | 56/10.2 A |
| 2016/0131224 A1* | 5/2016 | Schepperle | ............. | F16H 3/097 |
| | | | | 74/664 |

\* cited by examiner

ELECTRIC TRANSAXLE WITH INTEGRAL POWER GENERATING DEVICE

CROSS-REFERENCE TO RELATED APPLICATION

This application claims the benefit of Provisional Application No. 62/043,274, filed Aug. 28, 2014, and Provisional Application No. 62/048,518, filed Sep. 10, 2014, which are incorporated herein by reference in their entirety.

BACKGROUND OF THE INVENTION

This invention relates to a drive system for use in vehicles such as lawn and garden tractors, stand-on mowers, walk-behind snow throwers and mowers, and the like, including both single transaxle drives and dual transaxle drives for use in zero-turn applications.

SUMMARY OF THE INVENTION

The invention comprises a transaxle having an electric motor that is controlled by a vehicle user and that drives at least one output axle. The transaxle includes a power generating device that powers the electric motor and a reduction gear train engaged to and driven by the electric motor. The transaxle includes a common housing in which the power generator, the electric motor, and the reduction gear system are each disposed. In dual-axle systems, the transaxle also includes a differential engaged to and driven by the reduction gear system to power a pair of oppositely extending output axles. The differential is also disposed within the common housing.

A better understanding of the invention will be obtained from the following detailed descriptions and accompanying drawings, which set forth illustrative embodiments that are indicative of the various ways in which the principals of the invention may be employed.

DETAILED DESCRIPTION OF THE DRAWINGS

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

Figure 1:
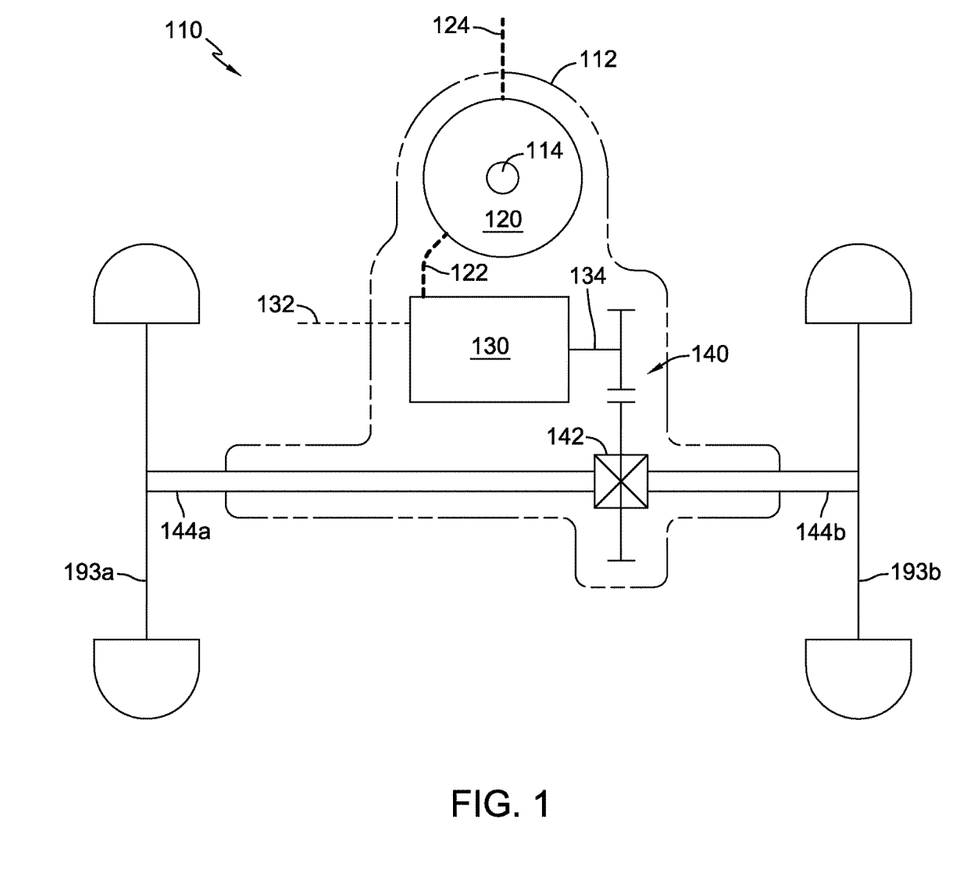
FIG. 1 is a schematic drawing of one embodiment of the transaxle of the present disclosure including a power generating device, an electric motor, a reduction gear train, and a differential all disposed within a common housing.

Referring now to the Figures, FIG. 1 illustrates one embodiment of a transaxle 110 including a power generating device 120, an electric motor 130, a reduction gear train 140, and a differential 142 all disposed within a common transaxle housing 112. The power generating device 120 is powered by an input shaft 114 connected to and driven by a prime mover, such as prime mover 491 in FIG. 4. Power generating device 120 and the other power generating devices depicted herein are shown as generators, although it will be understood that each may alternatively be an alternator or any other suitable device, depending on the end user's needs. The prime mover may also power other outputs, such as a mowing deck or an auger (not shown) for a snow thrower. It will be understood that the power generating devices depicted herein, such as power generating device 120, may use or incorporate a separate controller for purposes of power management.

The power generating device 120 converts the rotation of input shaft 114 into electrical power. Electrical power generated by power generating device 120 is transferred from power generating device 120 to electric motor 130 via a conductor 122 (such as suitable wiring) to power electric motor 130, and to a battery such as battery 475 shown in FIG. 4, by means of conductor 124. Using this electrical power, electric motor 130 drives a motor output shaft 134 that is engaged to and drives the reduction gear train 140. The reduction gear train 140 is engaged to differential 142, and provides the desired reduction from the motor output shaft 134 to differential 142. The differential 142 is engaged to and individually controls the output of (i.e., the rotation of) a first axle 144a and an opposing second axle 144b, each of which extends from the common transaxle housing 112. The first axle 144a is engaged to a first wheel 193a configured to rotate therewith, and second axle 144b is engaged to an opposing second wheel 193b configured to rotate therewith.

One or more motor controls can be powered by the power generating device 120 or by a battery, or a combination of the two, and can be used to provide a control signal to electric motor 130 via conductor 132 (such as suitable wiring) to permit a vehicle user to control the electric motor 130.

Figure 2:
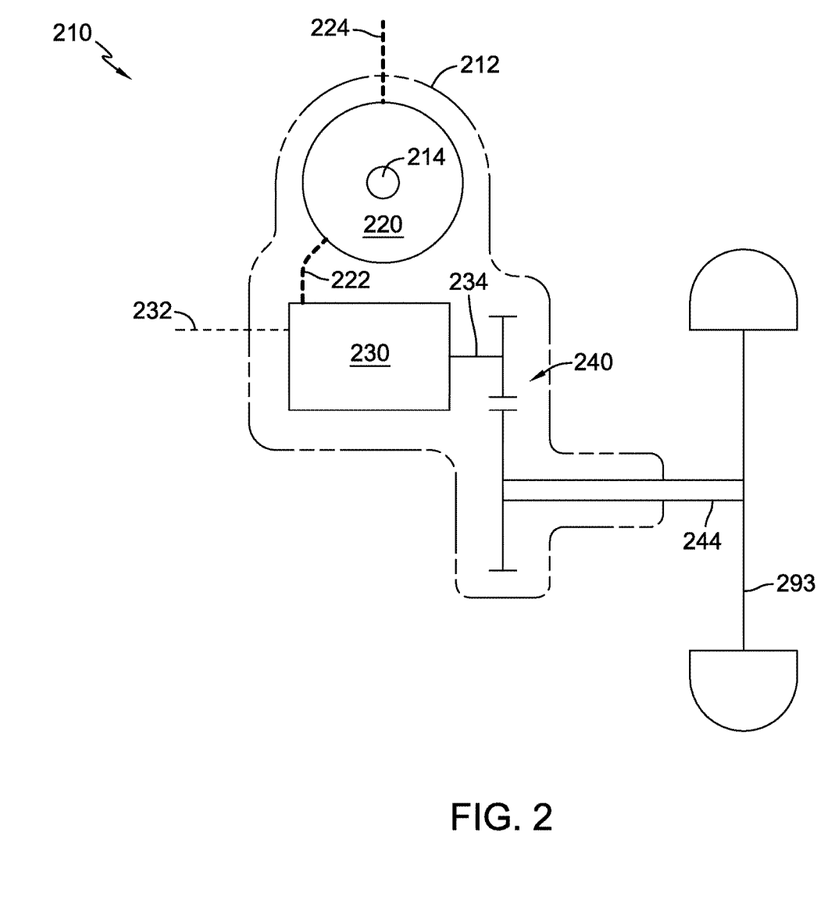
FIG. 2 is a schematic drawing of another embodiment of the transaxle of the present disclosure including a power generating device, an electric motor, and a reduction gear train all disposed within a common housing.

FIG. 2 illustrates another embodiment of a transaxle 210 including a power generating device 220, an electric motor 230, and a reduction gear train 240 all disposed within a common transaxle housing 212. A pair of transaxles 210 may be employed, for instance, in a vehicle having zero-turn capabilities, such as vehicle 690 shown in FIG. 6. The power generating device 220 is powered by an input shaft 214 connected to and driven by a prime mover. The prime mover may also power other outputs, such as a mowing deck or an auger (not shown) for a snow thrower.

The power generating device 220 converts the rotation of input shaft 214 into electrical power. Electrical power generated by power generating device 220 is transferred from power generating device 220 to electric motor 230 via a conductor 222 to power electric motor 230, and to a battery such as battery 675 shown in FIG. 6, by means of conductor 224. Using this electrical power, the electric motor 230 drives a motor output shaft 234 that is engaged to and drives the reduction gear train 240. The reduction gear train 240 is engaged to and drives an axle 244, and provides the desired reduction from motor output shaft 234 to axle 244. The axle 244 is engaged to a wheel 293 configured to rotate therewith.

One or more motor controls can be powered by the power generating device 220 or by a battery, or a combination of the two, and can be used to provide a control signal to electric motor 230 via conductor 232 (such as suitable wiring) to permit a vehicle user to control the electric motor 230.

Figure 3:
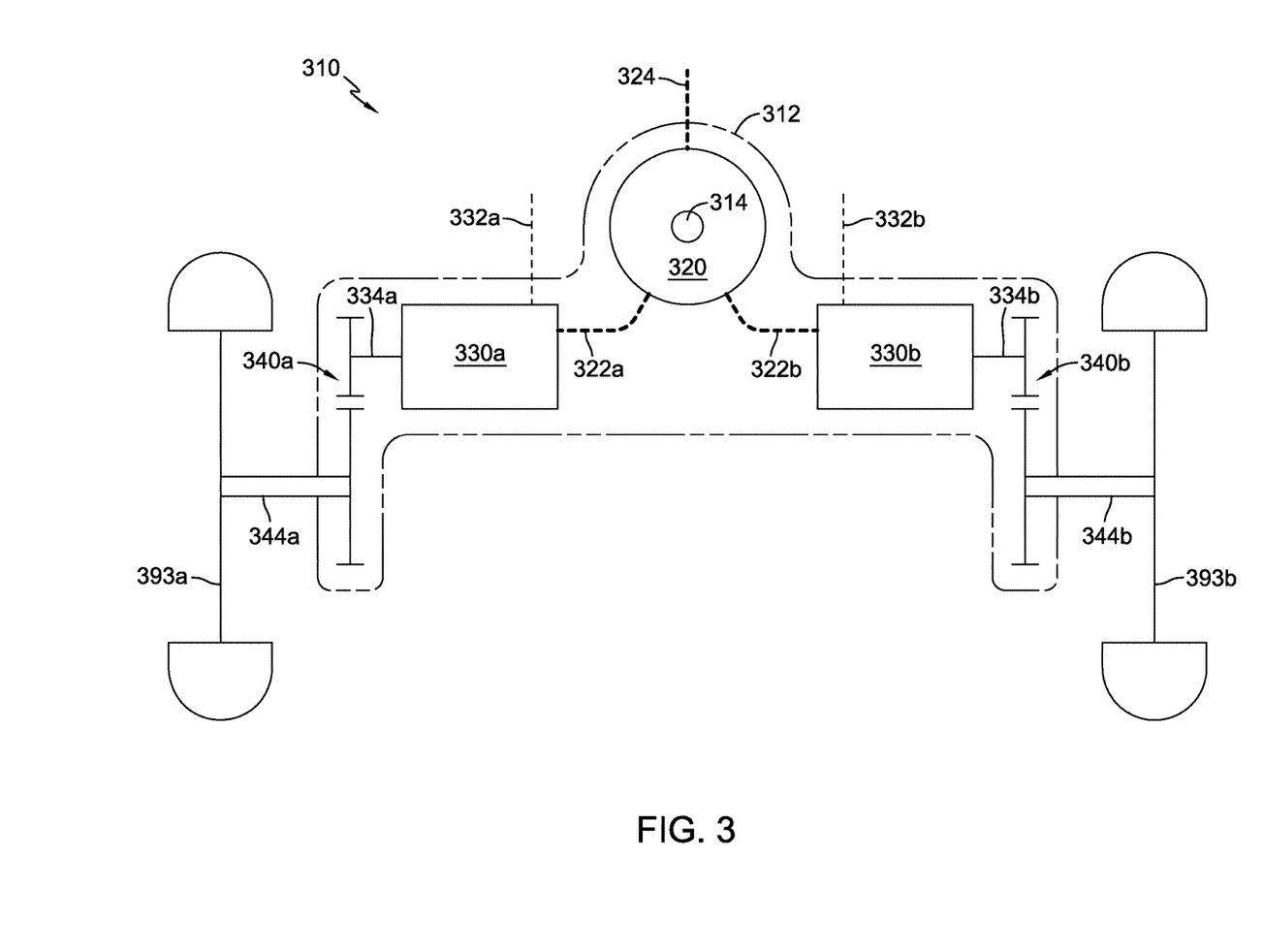
FIG. 3 is a schematic drawing of one embodiment of the transaxle of the present disclosure including a power generating device, two electric motors, and two reduction gear trains all disposed within a common housing.

FIG. 3 illustrates another embodiment of a transaxle 310 including a power generating device 320, a first electric motor 330a, a second electric motor 330b, a first reduction gear train 340a, and a second reduction gear train 340b all disposed within a common transaxle housing 312. The transaxle 310 may be employed, for instance, in a walk-behind mower or snow-thrower. The power generating device 320 is powered by input shaft 314 connected to and driven by a prime mover. The prime mover may also power other outputs, such as a mowing deck or an auger (not shown) for a snow thrower.

The power generating device 320 converts the rotation of input shaft 314 into electrical power. Electrical power generated by power generating device 320 is transferred from power generating device 320 to first electric motor 330a via a first conductor 322a to power electric motor 330a. Electrical power generated by power generating device 320 is also transferred to second electric motor 330b via a second conductor 322b to power the second electric motor 330b, and to a battery such as battery 775 shown in FIG. 7, by means of conductor 324. Using this electrical power, first electric motor 330a drives a first motor output shaft 334a that is engaged to and drives first reduction gear train 340a and second electric motor 330b drives a second motor output shaft 334b that is engaged to and drives second reduction gear train 340b. The first reduction gear train 340a is engaged to and drives a first axle 344a, and provides the desired reduction from first motor output shaft 334a to first axle 344a. The first axle 344a is engaged to a first wheel 393a configured to rotate therewith. Similarly, second reduction gear train 340b is engaged to and drives a second axle 344b, and provides the desired reduction from second motor output shaft 334b to second axle 344b. The second axle 344b is engaged to a second wheel 393b configured to rotate therewith.

One or more motor controls can be powered by the power generating device 120 or by a battery, or a combination of the two, and can be used to provide control signal to first electric motor 330a and second electric motor 330b via conductors 332a, 332b, respectively to permit a vehicle user to control the electric motors 330a, 330b.

Figure 4:
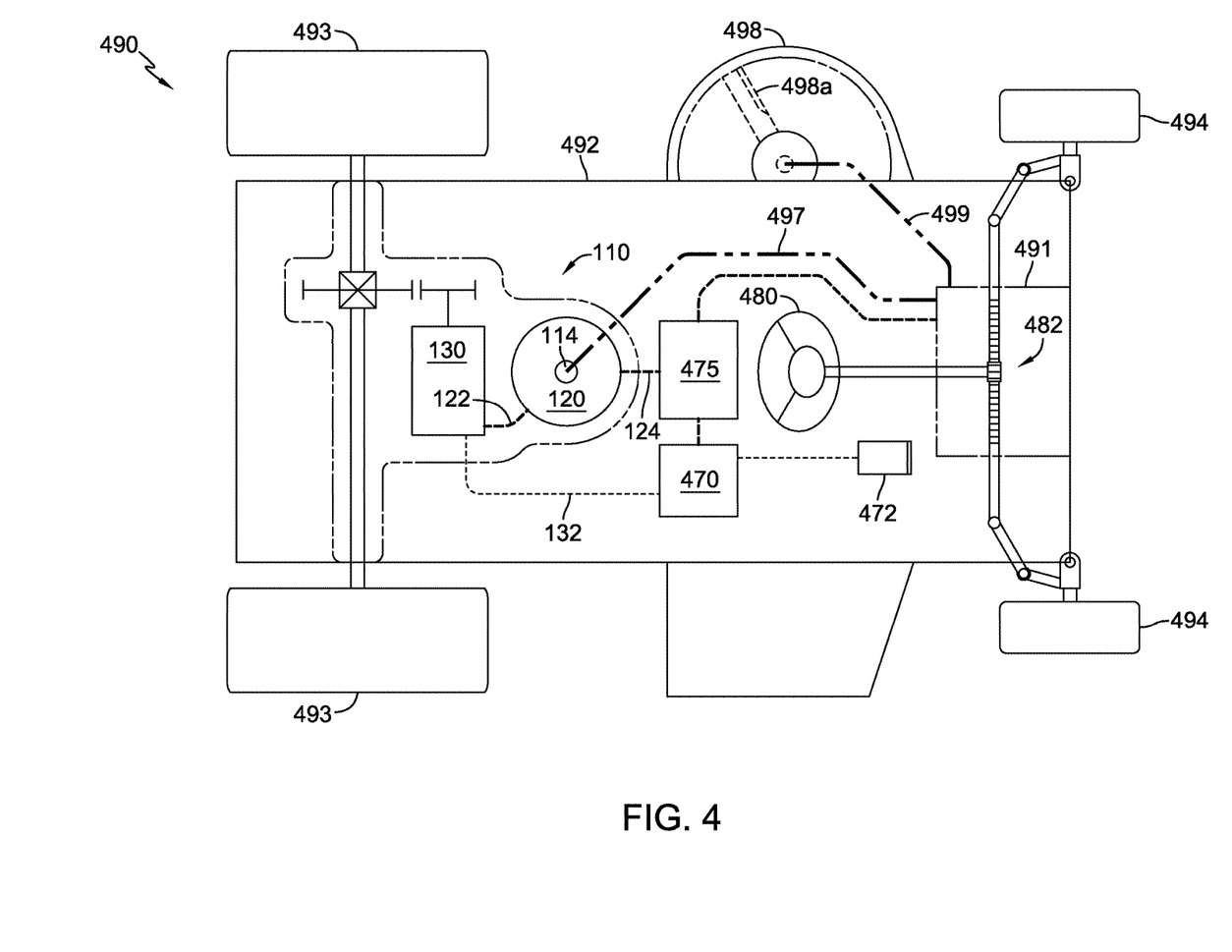
FIG. 4 is a top plan view of a riding vehicle including the transaxle of FIG. 1 and a mechanical steering mechanism.

FIG. 4 illustrates a riding vehicle 490 including the transaxle 110 and a frame 492 that supports the transaxle 110. The vehicle 490 includes a prime mover 491 supported by the frame 492 and configured to drive the input shaft 114 of the transaxle 110, which in turn powers the power generating device 120 of transaxle 110 (as described above in conjunction with FIG. 1). In this embodiment, vehicle 490 includes a belt and pulley assembly 497 that operably connects prime mover 491 to input shaft 114 of transaxle 110 such that prime mover 491 may drive input shaft 114, though any other suitable power transfer device or system may be employed. Prime mover 491 also powers one or more blades 498a of a mowing deck 498 supported by frame 492 of vehicle 490. In this embodiment, vehicle 490 includes a belt and pulley assembly 499 that operably connects prime mover 491 to mowing deck 498 such that prime mover 491 may drive blade(s) 498a, though any other suitable power transfer device or system may be employed.

Vehicle 490 also includes a controller 470 operatively connected to electric motor 130 of transaxle 110 and an accelerator pedal 472 (or other suitable operator control device) operatively connected to controller 470. Controller 470 and accelerator pedal 472 enable the vehicle user to control the electric motor 130 of transaxle 110. More specifically, in this embodiment, when the vehicle user actuates (or releases) the accelerator pedal 472, the controller 470 sends an appropriate control input to the electric motor 130 of the transaxle 110 to modify the output of the electric motor 130 and, therefore, the output of the transaxle 110, accordingly. Controller 470 is powered by a battery 475 powered by power generating device 120, though in other embodiments controller 470 is powered by a combination of battery 475 and the power generating device 120 or solely by the power generating device 120.

Vehicle 490 also includes rear wheels 493 and front wheels 494. The rear wheels 493 are engaged to and driven by transaxle 110 (as described above in conjunction with FIG. 1). The front wheels 494 are engaged to a steering mechanism 482 supported by frame 492. The steering mechanism 482 includes a steering wheel 480 and a plurality of mechanical linkages linking front wheels 494 to steering wheel 480 such that rotating the steering wheel 480 causes the front wheels 494 to rotate accordingly.

Figure 5:
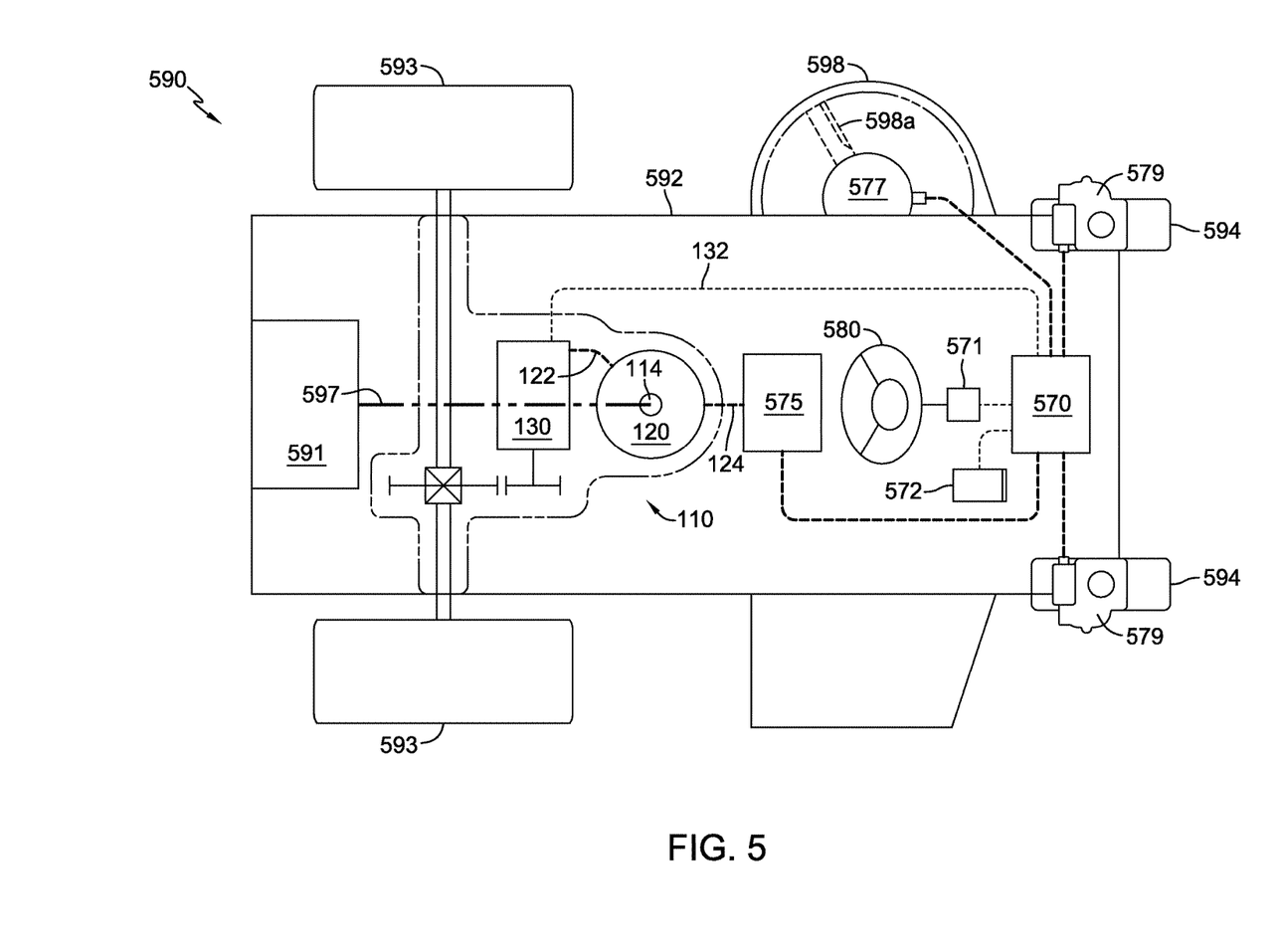
FIG. 5 is a top plan view of a riding vehicle including the transaxle of FIG. 1 and electronically-controlled steering.

FIG. 5 illustrates a riding vehicle 590 including the transaxle 110 and a frame 592 that supports the transaxle 110. Vehicle 590 includes a prime mover 591 supported by frame 592 and configured to drive input shaft 114 of transaxle 110, which in turn powers the power generating device 120 of transaxle 110 (as described above in conjunction with FIG. 1). In this embodiment, vehicle 590 includes a belt and pulley assembly 597 that operably connects prime mover 591 to input shaft 114 of transaxle 110 such that prime mover 591 may drive input shaft 114, though any other suitable power transfer device or system may be employed.

Vehicle 590 also includes a controller 570 operatively connected to electric motor 130 of transaxle 110 and an accelerator pedal 572 (or other suitable operator control device) operatively connected to the controller 570. The controller 570 and the accelerator pedal 572 enable the vehicle user to control electric motor 130 of transaxle 110.

More specifically, in this embodiment, when the vehicle user actuates (or releases) the accelerator pedal 572, the controller sends an appropriate control input to the electric motor 130 of transaxle 110 to modify the output of the electric motor 130 and, therefore, the output of the transaxle 110, accordingly. Controller 570 is powered by a battery 575 supported by frame 592 and powered by the power generating device 120, though in other embodiments the controller 570 is powered by a combination of battery 575 and the power generating device 120 or solely by the power generating device 120.

Vehicle 590 also includes rear wheels 593 and front wheels 594. The rear wheels 593 are engaged to and driven by transaxle 110 (as described above in conjunction with FIG. 1). Each front wheel 594 is engaged to an electric actuator 579 which is configured to rotate that particular front wheel 594 about an appropriate vertical axis to provide steering. The electric actuators 579 are operatively connected to controller 570 such that controller 570 may control the electric actuators 579. Vehicle 590 includes a steering wheel 580 and a steering position sensor 571 operatively connected to steering wheel 580 and controller 570. In operation, steering position sensor 571 senses and communicates a rotation of the steering wheel 580 to controller 570, which controls the electric actuators 579 to cause the front wheels 594 to rotate according to the rotation of steering wheel 580.

Vehicle 590 also includes a mowing deck 598 supported by frame 592 and one or more auxiliary electric motors 577 operatively connected to and configured to rotate one or more blades 598a of mowing deck 598. In this embodiment, the one or more auxiliary electric motors 577 are operatively connected to controller 570, and the necessary operator switches as may be required, such that the vehicle user may control operation of the one or more electric motors 577 and, therefore, rotation of blade(s) 598a, using controller 570. In certain embodiments, each blade is operatively connected to a separate electric motor that is configured to rotate that particular blade. In other embodiments, the vehicle includes fewer electric motors than it does blades. In these embodiments, certain of the blades may be directly driven by the electric motors while other of the blades may be driven by the electric motors via any suitable power transfer device or system operatively connecting the electric motors to the blades.

Figure 6:
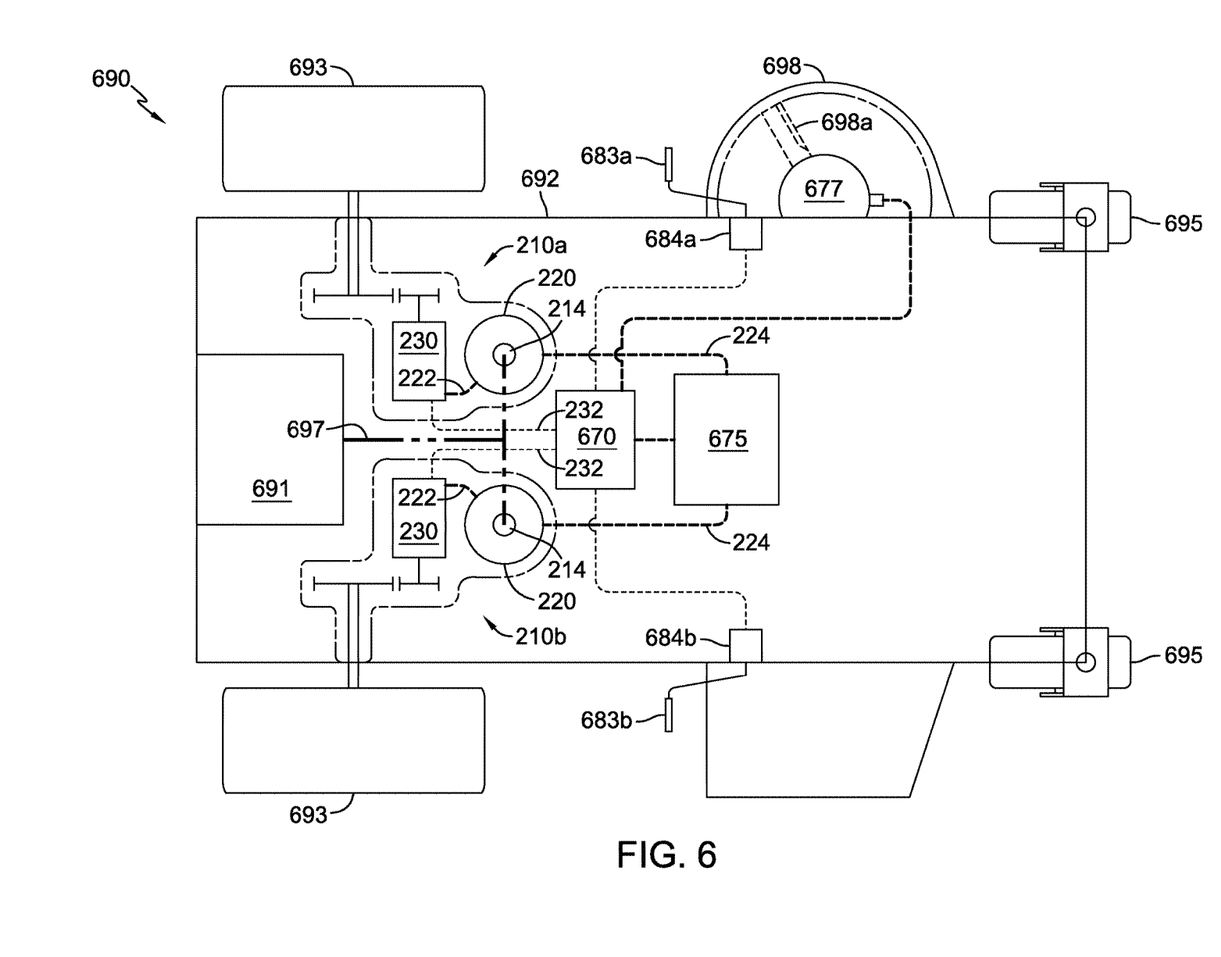
FIG. 6 is a top plan view of a riding zero-turn vehicle including two of the transaxles as shown in FIG. 2.

FIG. 6 illustrates a zero-turn vehicle 690 including two transaxles 210a and 210b and a frame 692 that supports transaxles 210a and 210b. Vehicle 690 includes a prime mover 691 supported by frame 692 and configured to drive the input shafts 214 of transaxles 210a and 210b, which in turn power the power generating devices 220 of the transaxles 210a and 210b (as described above in conjunction with FIG. 2). In this embodiment, vehicle 690 includes a belt and pulley assembly 697 that operably connects prime mover 691 to input shafts 214 of transaxles 210a and 210b such that prime mover 691 may drive input shafts 214, though any other suitable power transfer device or system may be employed.

Vehicle 690 also includes two control levers 683a and 683b (or other suitable operator control devices), two position sensors 684a and 684b operatively connected to the respective control levers 683a and 683b such that position sensors 684a and 684b may detect the positions of the corresponding control levers 683a and 683b, and a controller 670 operatively connected to position sensors 684a and 684b. The control lever 683a, the position sensor 684a, and the controller 670 enable the vehicle user to control the electric motor 230 of transaxle 210a, and the control lever 683b, the position sensor 684b, and the controller 670 enable the vehicle user to separately control the electric motor 230 of transaxle 210b. More specifically, in this embodiment, when the vehicle user moves control lever 683a (or 683b) to a particular position, position sensor 684a (or 683b) communicates this position to controller 670, which in turn sends an appropriate control input to electric motor 230 of transaxle 210a (or 210b) to modify the output of the electric motor 230 and, therefore, the output of transaxle 210a (or 210b), accordingly. Controller 670 is powered by a battery 675 which is connected to and powered by the power generating devices 220 of transaxles 210a and 210b, though in other embodiments the controller 670 may be powered by a combination of the battery 675 and the power generating devices 220 of transaxles 210a and 210b, solely by the power generating devices 220 of the transaxles 210a and 210b, or by the power generating device 220 of only one of the transaxles 210a and 210b.

Vehicle 690 also includes rear wheels 693 and front casters 695. One of the rear wheels 693 is engaged to and driven by transaxle 210a (as described above in conjunction with FIG. 2) and another one of the rear wheels 693 is engaged to and separately driven by the transaxle 210b (as described above in conjunction with FIG. 2).

Vehicle 690 also includes a mowing deck 698 supported by frame 692 and one or more auxiliary electric motors 677 operatively connected to and configured to rotate one or more blades 698a of mowing deck 698. In this embodiment, the one or more auxiliary electric motors 677 are operatively connected to controller 670, and the necessary operator switches as may be required, such that the vehicle user may control operation of the one or more electric motors 677 and, therefore, rotation of blade(s) 698a, using controller 670. In certain embodiments, each blade is operatively connected to a separate electric motor that is configured to rotate that particular blade. In other embodiments, the vehicle includes fewer electric motors than it does blades. In these embodiments, certain of the blades may be directly driven by the electric motors while other of the blades may be driven by the electric motors via any suitable power transfer device or system operatively connecting the electric motors to the blades.

Figure 9:
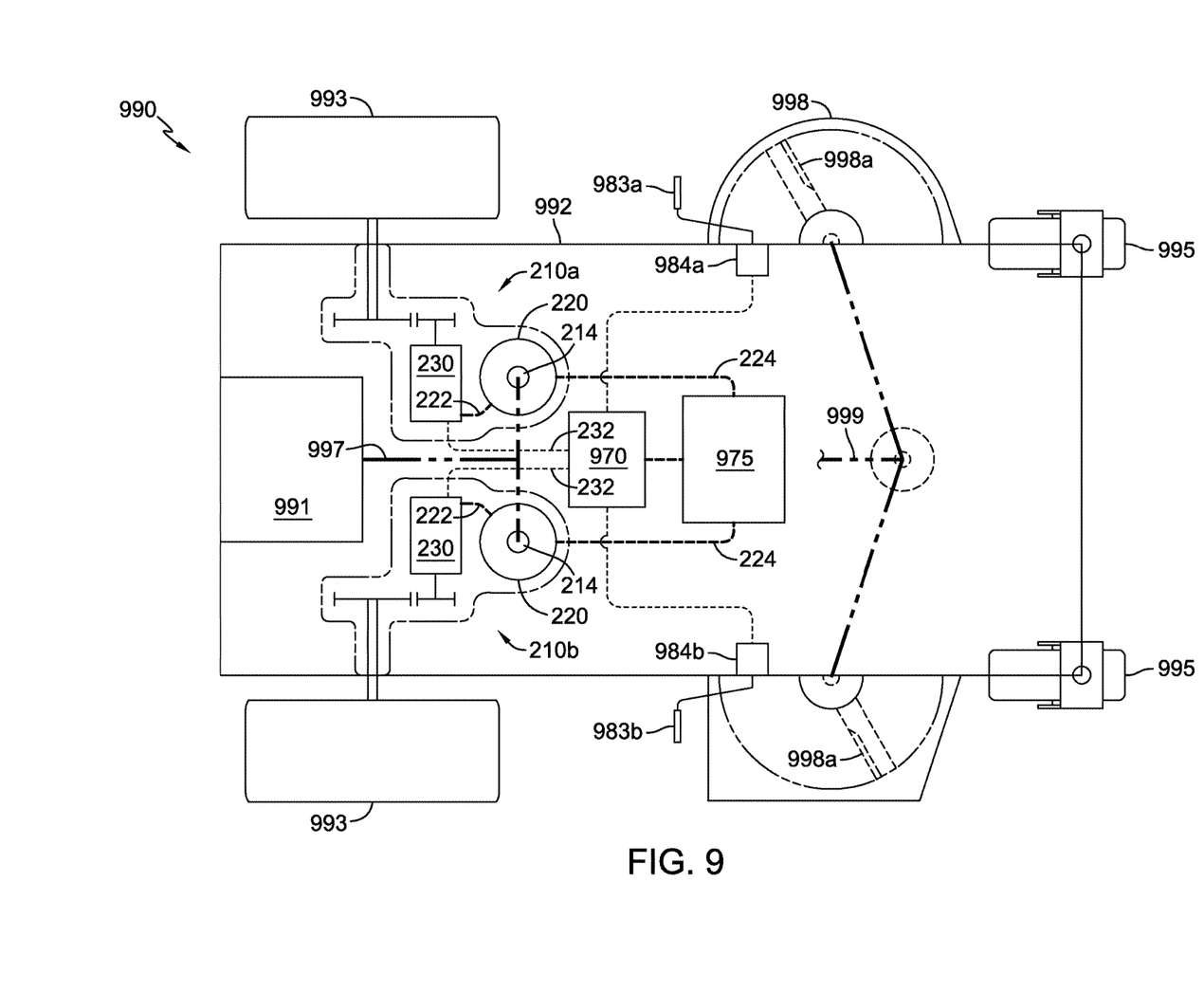
FIG. 9 is a top plan view of riding zero-turn vehicle similar to that shown in FIG. 6 and including two of the transaxles shown in FIG. 2, with the prime mover driving the deck assembly.

FIG. 9 illustrates a zero-turn vehicle 990 that is similar in many respects to the vehicle 690 described above. Vehicle 990 includes two transaxles 210a and 210b and prime mover 991 supported by frame 992, with prime mover 991 configured to drive the input shafts 214 of transaxles 210a and 210b, which in turn power the power generating devices 220 of the transaxles 210a and 210b (as described above in conjunction with FIG. 2). Vehicle 990 includes a belt and pulley assembly 997 that operably connects prime mover 991 to input shafts 214 of transaxles 210a and 210b.

Vehicle 990 also includes two control levers 983a and 983b (or other suitable operator control devices) and two position sensors 984a and 984b operatively connected thereto to detect the positions of control levers 983a and 983b, and controller 970 operatively connected to position sensors 984a and 984b. Control lever 983a, position sensor 984a, and controller 970 enable the vehicle user to control the electric motor 230 of transaxle 210a, and control lever 983b, position sensor 984b, and controller 970 enable the vehicle user to separately control electric motor 230 of transaxle 210b in a manner similar to that described above. Controller 970 is powered by battery 975 and powered by the power generating devices 220 of transaxles 210a and 210b.

Vehicle 990 also includes rear wheels 993 and front casters 995 similar to the embodiment in FIG. 6. Vehicle 990 further includes a mowing deck 998 supported by frame 992. Similar to the embodiment shown in FIG. 8, prime mover 991 also powers one or more blades 998a of a mowing deck 998 by means of a belt and pulley assembly 999 that operably connects prime mover 991 to mowing deck 998 to drive blade(s) 998a.

Figure 7:
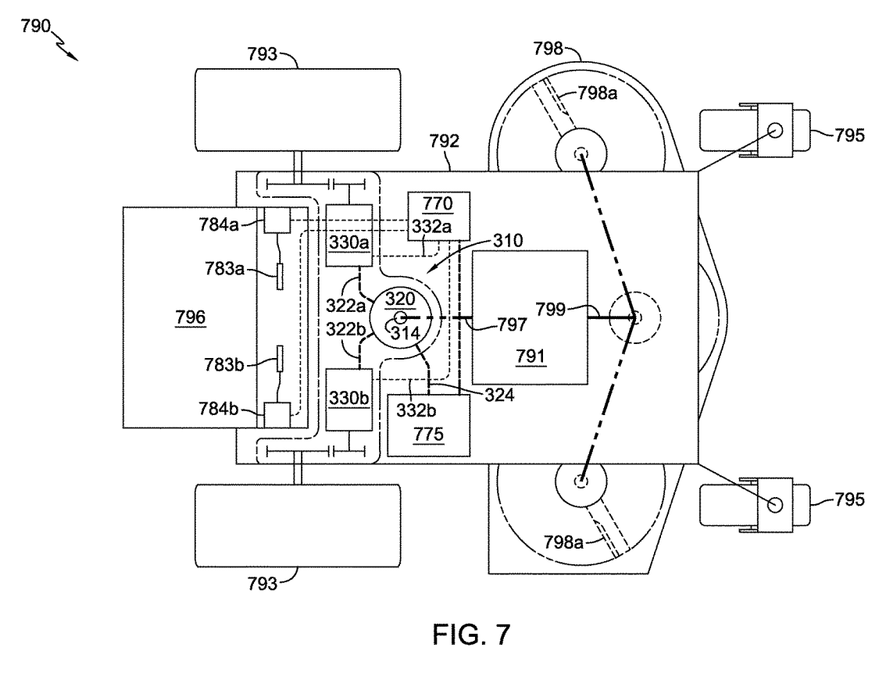
FIG. 7 is a top plan view of a stand-on zero turn vehicle including the transaxle of FIG. 3.

FIG. 7 illustrates a zero-turn vehicle 790 including the transaxle 310 and a frame 792 that supports the transaxle 310. The vehicle 790 includes a prime mover 791 configured to drive the input shaft 314 of the transaxle 310, which in turn powers the power generating device 320 of the transaxle 310 (as described above in conjunction with FIG. 3). In this embodiment, the vehicle 790 includes a belt and pulley assembly 797 that operably connects the prime mover 791 to the input shaft 314 of the transaxle 310 such that the prime mover 791 may drive the input shaft 314, though any other suitable power transfer device or system may be employed. The prime mover 791 also powers one or more blades 798a of a mowing deck 798 supported by the frame 792 of the vehicle 790. In this embodiment, the vehicle 790 includes a belt and pulley assembly 799 that operably connects the prime mover 791 to the mowing deck 798 such that the prime mover 791 may drive the blade(s) 798a, though any other suitable power transfer device or system may be employed.

The vehicle 790 also includes two control levers 783a and 783b (or other suitable operator control devices) on opposite sides of vehicle 790, two position sensors 784a and 784b operatively connected to the respective control levers 783a and 783b such that the position sensors 784a and 784b may detect the positions of the corresponding control levers 783a and 783b, and a controller 770 operatively connected to the position sensors 784a and 784b. The control lever 783a, the position sensor 784a, and the controller 770 enable the vehicle user to control the electric motor 330a of the transaxle 310, and the control lever 783b, the position sensor 784b, and the controller 770 enable the vehicle user to separately control the electric motor 330b of the transaxle 310. More specifically, in this embodiment, when the vehicle user moves the control lever 783a (or 783b) to a particular position, the position sensor 784a (or 783b) communicates this position to the controller 770, which in turn sends an appropriate control input to the electric motor 330a (or 330b) of the transaxle 310 to modify the output of the electric motor 330a (or 330b) and, therefore, the output of the transaxle 310, accordingly. The controller 770 is powered by a battery 775 and powered by the power generating device 320 of the transaxle 310, though in other embodiments the controller 770 is powered by a combination of the battery 775 and the power generating device 320 or solely by the power generating device 320.

Vehicle 790 also includes rear wheels 793 and front casters 795. The rear wheels 793 are engaged to and driven by transaxle 310 (as described above in conjunction with FIG. 3). Vehicle 790 also includes an operator platform 796 on which the vehicle user may stand when operating the vehicle 790.

Figure 8:
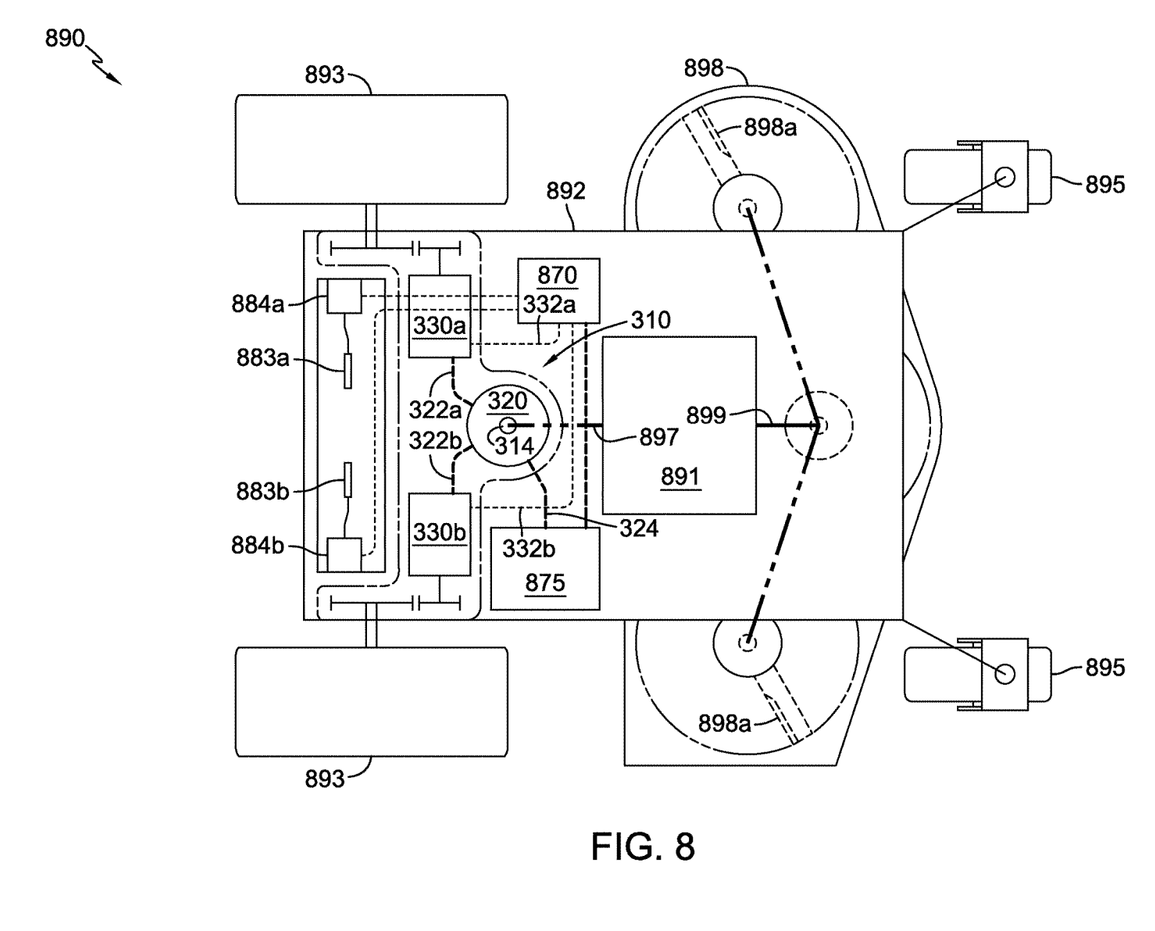
FIG. 8 is a top plan view of a walk-behind zero-turn vehicle including the transaxle of FIG. 3.

FIG. 8 illustrates a walk-behind zero-turn vehicle 890 including transaxle 310 and a frame 892 that supports transaxle 310. Vehicle 890 includes a prime mover 891 supported by frame 892 and configured to drive input shaft 314 of transaxle 310, which in turn powers power generating device 320 of the transaxle 310 (as described above in conjunction with FIG. 3). In this embodiment, vehicle 890 includes a belt and pulley assembly 897 that operably connects prime mover 891 to input shaft 314 of transaxle 310 such that prime mover 891 may drive input shaft 314, though any other suitable power transfer device or system may be employed. The prime mover 891 also powers one or more blades 898a of a mowing deck 898 supported by frame 892 of vehicle 890. In this embodiment, vehicle 890 includes a belt and pulley assembly 899 that operably connects prime mover 891 to mowing deck 898 such that prime mover 891 may drive blade(s) 898a, though any other suitable power transfer device or system may be employed.

The vehicle 890 also includes two control levers 883a and 883b (or other suitable operator control devices), two position sensors 884a and 884b operatively connected to the respective control levers 883a and 883b such that the position sensors 884a and 884b may detect the positions of the corresponding control levers 883a and 883b, and a controller 870 operatively connected to the position sensors 884a and 884b. The control lever 883a, the position sensor 884a, and the controller 870 enable the vehicle user to control the electric motor 330a of the transaxle 310, and the control lever 883b, the position sensor 884b, and the controller 870 enable the vehicle user to separately control the electric motor 330b of the transaxle 310. More specifically, in this embodiment, when the vehicle user moves the control lever 883a (or 883b) to a particular position, the position sensor 884a (or 883b) communicates this position to the controller 870, which in turn sends an appropriate control input to the electric motor 330a (or 330b) of transaxle 310 to modify the output of the electric motor 330a (or 330b) and, therefore, the output of the transaxle 310, accordingly. The controller 870 is powered by a battery 875 and powered by the power generating device 320 of the transaxle 310, though in other embodiments the controller 870 is powered by a combination of the battery 875 and the power generating device 320 or solely by the power generating device 320.

The vehicle 890 also includes rear wheels 893 and front casters 895. The rear wheels 893 are engaged to and driven by the transaxle 310 (as described above in conjunction with FIG. 3).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

The invention claimed is:
1. A vehicle comprising:
a frame and a prime mover supported by the frame;
an operator control device disposed on the vehicle;
a transaxle disposed on the vehicle and comprising:
  a transaxle housing;
  a power generating device disposed within the transaxle housing;
  an input shaft having:
    a first end outside the transaxle housing and drivably engaged with the prime mover; and
    a second end inside the transaxle housing and directly drivably engaged with only the power generating device;
  an electric motor disposed within the transaxle housing and powered directly by the power generating device, the electric motor comprising a motor output shaft;

a reduction gear assembly disposed within the transaxle housing and directly engaged with and driven by only the motor output shaft; and
an axle extending out of the transaxle housing and directly engaged with and driven by only the reduction gear assembly;
a battery directly powered by the power generating device of the transaxle;
a controller disposed on the frame external to the transaxle housing and powered by the battery, the controller being operatively connected to the operator control device and to the electric motor of the transaxle such that the controller may control an output of the electric motor based on input received via the operator control device; and
a driven wheel drivably engaged with the axle.

2. The vehicle of claim 1, further comprising a plurality of steered wheels.

3. The vehicle of claim 1, further comprising a mowing deck supported by the frame and including one or more blades.

4. The vehicle of claim 3, wherein the prime mover drives at least one of the one or more blades.

5. The vehicle of claim 1, wherein the operator control device comprises a pair of control levers, each of the pair of control levers being disposed on opposite sides of the vehicle.

6. The vehicle of claim 1, further comprising:
a second electric motor disposed within the transaxle housing and having a second motor output shaft, wherein the second electric motor is directly powered by the power generating device;
a second reduction gear assembly disposed within the transaxle housing and directly engaged with and driven by only the second motor output shaft; and
a second axle extending out of the transaxle housing and directly engaged with and driven by only the second reduction gear assembly, wherein the second axle is drivably engaged with a second driven wheel of the vehicle.

7. The vehicle of claim 1, wherein the power generating device is a generator.

8. The vehicle of claim 1, wherein the power generating device is an alternator.

9. The vehicle of claim 1, wherein the prime mover is disposed on the frame forward of the transaxle relative to the vehicle.

10. The vehicle of claim 1, wherein the transaxle is partially disposed between the battery and the controller.

11. The vehicle of claim 1, wherein the operator control device is disposed at an aft end of the vehicle.

12. The vehicle of claim 1, wherein the prime mover is disposed at an aft end of the vehicle and the transaxle is disposed between the battery and the prime mover.

13. A vehicle comprising:
a frame;
a prime mover supported by the frame;
first and second operator control devices disposed on the vehicle;
a transaxle disposed on the vehicle and comprising:
a transaxle housing;
a power generating device disposed within the transaxle housing;
an input shaft having:
a first end outside the transaxle housing and drivably engaged with the prime mover; and
a second end inside the transaxle housing and directly drivably engaged with only the power generating device;
a first drive assembly disposed in the transaxle housing and comprising:
a first electric motor comprising a first motor output shaft, disposed within the transaxle housing, and powered directly by the power generating device; and
a first reduction gear assembly disposed within the transaxle housing and directly engaged with and driven by only the first motor output shaft;
a second drive assembly disposed in the transaxle housing and comprising:
a second electric motor comprising a second motor output shaft, disposed within the transaxle housing, and powered directly by the power generating device; and
a second reduction gear assembly disposed within the transaxle housing and directly engaged with and driven by only the second motor output shaft;
a first axle extending out of the transaxle housing and directly engaged with and driven by only the first reduction gear assembly; and
a second axle extending out of the transaxle housing and directly engaged with and driven by only the second reduction gear assembly;
a battery powered directly by the power generating device of the transaxle;
a controller powered by the battery, the controller being disposed on the frame external to the transaxle housing and operatively connected to the first and second operator control devices and the first and second electric motors of the transaxle such that the controller may control the output of the first and second electric motors based on input received via the first and second operator control devices;
a first driven wheel drivably engaged with the first axle; and
a second driven wheel drivably engaged with the second axle.

14. The vehicle of claim 13, further comprising a mowing deck supported by the frame and including one or more blades.

15. The vehicle of claim 14, wherein the prime mover drives the one or more blades.

16. The vehicle of claim 13, further comprising an operator platform supported by the frame.

17. The vehicle of claim 16, wherein the first and second operator control devices comprise a pair of levers disposed on opposite sides of the vehicle.

18. A vehicle comprising:
a frame, a prime mover disposed on the frame, and a pair of driven wheels;
a first transaxle comprising:
a first power generating device disposed within a first transaxle housing;
a first input shaft having:
a first end outside the first transaxle housing and drivably engaged with the prime mover; and
a second end inside the first transaxle housing and directly drivably engaged with only the first power generating device;
a first electric motor disposed within the first transaxle housing and comprising a first motor output shaft, the first electric motor being powered directly by the first power generating device;

a first reduction gear assembly disposed within the first transaxle housing and directly engaged with and driven by only the first motor output shaft; and a first axle extending out of the first transaxle housing and directly engaged with and driven by only the first reduction gear assembly, the first axle being engaged with and driving one of the pair of driven wheels;

a second transaxle comprising:

a second power generating device disposed within a second transaxle housing;

a second input shaft having:

a third end outside the second transaxle housing and drivably engaged with the prime mover; and a fourth end inside the second transaxle housing and directly drivably engaged with only the second power generating device;

a second electric motor disposed within the second transaxle housing and comprising a second motor output shaft, the second electric motor being powered directly by the second power generating device;

a second reduction gear assembly disposed within the second transaxle housing and directly engaged with and driven by only the second motor output shaft; and a second axle extending out of the second transaxle housing and directly engaged with and driven by only the second reduction gear assembly, the second axle being engaged with and driving a second of the pair of driven wheels;

a battery directly electrically connected to and powered by the first power generating device and the second power generating device; and a controller disposed on the frame external to the transaxle housing and electrically connected to and powered by the battery, the controller being operatively connected to an operator control device disposed on the vehicle and to the first and second electric motors such that the controller may independently control the respective outputs of the first and second electric motors based on input received via the operator control device.

19. The vehicle of claim 18, further comprising a mowing deck supported by the frame and including at least one blade, wherein the prime mover directly drives the at least one blade.

20. The vehicle of claim 18, wherein the operator control device comprises a pair of control levers, each of the pair of control levers being disposed on opposite sides of the vehicle and being connected to the controller.

21. The vehicle of claim 18, wherein the prime mover is disposed at an aft end of the vehicle and the first transaxle and the second transaxle are disposed between the battery and the prime mover.

* * * * *